Patented Mar. 28, 1933

1,902,883

UNITED STATES PATENT OFFICE

PAUL NAWIASKY, OF LUDWIGSHAFEN-ON-THE-RHINE, AND JULIUS MUELLER, OF MANNHEIM, GERMANY, ASSIGNORS TO GENERAL ANILINE WORKS, INC., OF NEW YORK, N. Y., A CORPORATION OF DELAWARE

PRODUCTION OF VAT DYESTUFFS OF THE DIBENZANTHRONE SERIES

No Drawing. Original application filed September 22, 1926, Serial No. 221,396, and in Great Britain February 14, 1927. Divided and this application filed August 4, 1928. Serial No. 297,551.

The present invention relates to the production of new vat dyestuffs.

The subject-matter of this application has been divided out from our copending application for the production of new vat dyestuffs Ser. No. 221,396, filed September 22, 1927, which has matured into U. S. Patent No. 1,742,317, dated January 7, 1930.

We have found that valuable new vat dyestuffs are produced by treating with alkaline agents the aminobenzanthrone obtainable by reducing the nitrobenzanthrone described in Example 2 of the U. S. Patent No. 876,679. If, for example, the said aminobenzanthrone be fused with alcoholic potash, a brilliant green dyestuff is obtained. Other vat dyestuffs may be obtained by employing other alkaline agents or varying the conditions with regard to proportions, temperature and the like. Similar valuable vat dyestuffs, which are often identical with the green dyestuff just described are obtained by treating substitution products of the aforesaid aminobenzanthrone, which contain exchangeable substituents in the Bz-1-position, or the N-acylated derivatives thereof with alkaline agents. The temperature employed for the treatment with alkaline agents will generally range between about 120° and 200° C.

The green dyestuffs prepared according to the methods above described are transformed by the action of oxidizing agents into brown vat dyestuffs of excellent fastness. The brown dyestuffs may also be produced on the fibre, by treating the dyeings made with the said green dyestuffs with oxidizing agents such as hypochlorites, fast brown dyeings being produced.

Similar brown vat dyestuffs are also obtained in a simple manner by treating the beforementioned nitrobenzanthrone directly with alkaline agents. The resulting dyestuffs may be purified by treatment with oxidizing agents such as hypochlorite.

The following examples will serve to further illustrate the nature of the said invention but the invention is not limited to these examples. The parts are by weight.

Example 1

5 parts of the dyestuff, obtained according to Example 1 of U. S. Patent No. 1,742,317, dated January 7, 1930, are brought into a state of fine distribution and suspended in glacial acetic acid. A solution of 10 parts of chromic acid in 400 parts of water is then run in gradually at waterbath temperature, and the whole is heated on the waterbath for several hours. The dyestuffs after being filtered off by suction and washed until neutral, is then boiled with dilute hypochlorite solution, until the shade, as determined by means of a test portion, is no longer altered. The resulting dyestuff gives handsome, brown, very fast dyeings on cotton from a dark blue vat. The solution of the dyestuff in sulfuric acid is violet with a reddish tinge. We think it probable that the oxidation proceeds in accordance with the following equation:

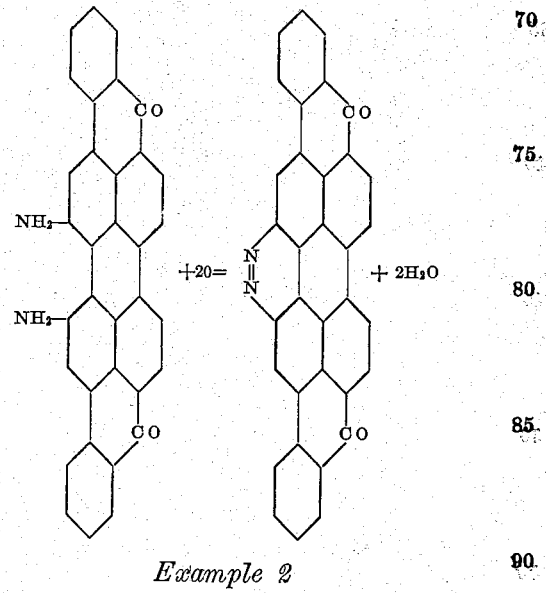

Example 2

10 parts of cotton are dyed, in any known or suitable manner, from the warm hydrosulfite vat with 0.2 part of the green dyestuff obtained according to Example 1 of U. S. Patent No. 1,742,317, dated January 7, 1930, and are then treated for a quarter of an hour with a dilute solution of bleaching powder containing from 0.3 to 0.5 per cent of active chlorine. The original green changes to a rich brown. The reaction proceeds probably as indicated in Example 1.

What we claim is:

1. The process of producing a new valuable brown vat dyestuff which comprises treating with an oxidizing agent the vat dyestuff obtainable by treating in an alcoholic caustic potash melt at between 120 and 200° C. aminobenzanthrone, which is derived from the nitrobenzanthrone obtainable by treating benzanthrone with nitric acid in boiling glacial acetic acid.

2. The process of producing a new valuable brown vat dyestuff which comprises treating with hypochlorite solution the vat dyestuff obtainable by treating in an alcoholic caustic potash melt at between 120 and 200° C. aminobenzanthrone, which is obtainable by reducing the nitrobenzanthrone obtainable by treating benzanthrone with nitric acid in boiling glacial acetic acid.

In testimony whereof, we affix our signatures.

PAUL NAWIASKY.
JULIUS MUELLER.